United States Patent
Li (10) Patent No.: US 11,099,739 B2
(45) Date of Patent: Aug. 24, 2021

(54) SYSTEM AND METHOD FOR ACCESSING REDUNDANT ARRAY OF INDEPENDENT DISKS

(71) Applicant: Shanghai Zhaoxin Semiconductor Co., Ltd., Shanghai (CN)

(72) Inventor: Yong Li, Beijing (CN)

(73) Assignee: Shanghai Zhaoxin Semiconductor Co., Ltd., Shanghai (CN)

(*) Notice: Subject to any disclaimer, the term of this patent is extended or adjusted under 35 U.S.C. 154(b) by 113 days.

(21) Appl. No.: 16/541,177

(22) Filed: Aug. 15, 2019

(65) Prior Publication Data

US 2020/0073556 A1 Mar. 5, 2020

(30) Foreign Application Priority Data

Aug. 29, 2018 (CN) .......................... 201810993750.1

(51) Int. Cl.
| | |
|---|---|
| *G06F 12/00* | (2006.01) |
| *G06F 13/00* | (2006.01) |
| *G06F 13/28* | (2006.01) |
| *G06F 3/06* | (2006.01) |

(52) U.S. Cl.
CPC .......... *G06F 3/0611* (2013.01); *G06F 3/0631* (2013.01); *G06F 3/0656* (2013.01); *G06F 3/0659* (2013.01); *G06F 3/0689* (2013.01)

(58) Field of Classification Search
CPC ..... G06F 3/0689; G06F 3/0659; G06F 3/0631
USPC ........................................................ 711/114
See application file for complete search history.

(56) References Cited

U.S. PATENT DOCUMENTS

| | | | | |
|---|---|---|---|---|
| 2006/0294416 A1* | 12/2006 | Tsai | ..................... | G06F 11/1076 714/6.2 |
| 2008/0229012 A1* | 9/2008 | Therene | .............. | G06F 11/1076 711/114 |
| 2019/0026038 A1* | 1/2019 | Voigt | .................... | G06F 3/0665 |

FOREIGN PATENT DOCUMENTS

| | | |
|---|---|---|
| CN | 1282067 | 10/2006 |
| CN | 103645862 | 3/2014 |

OTHER PUBLICATIONS

"Office Action of China Counterpart Application", dated Apr. 1, 2021, p. 1-p. 11.

* cited by examiner

*Primary Examiner* — Edward J Dudek, Jr.
*Assistant Examiner* — Sidney Li
(74) *Attorney, Agent, or Firm* — JCIPRNET (57) ABSTRACT

A system and method for accessing redundancy array of independent disks (RAID) are provided. The system is coupled between a central processing unit (CPU), a main memory and the RAID, and includes an arithmetic circuit, a register and a disk controller. The arithmetic circuit is coupled to the CPU and the main memory, and is configured to access data from the main memory. The arithmetic circuit calculates a plurality of syndromes of the data to be written and store the calculated syndromes of the plurality of syndromes into the main memory. The register is coupled to the arithmetic circuit, and is configured to store a calculation progress of the plurality of syndromes need to be calculated by the arithmetic circuit. The disk controller is coupled to the register and the RAID, and is configured to read the calculation progress from the register, and according to the calculation progress, to store the calculated syndromes of the plurality of syndromes from the main memory to the RAID.

21 Claims, 4 Drawing Sheets

SYSTEM AND METHOD FOR ACCESSING REDUNDANT ARRAY OF INDEPENDENT DISKS

CROSS-REFERENCE TO RELATED APPLICATION

This application claims the priority benefit of China application serial no. 201810993750.1, filed on Aug. 29, 2018. The entirety of the above-mentioned patent application is hereby incorporated by reference herein and made a part of this specification.

BACKGROUND

Technical Field

The disclosure relates to a data access system and method, and more particularly to a system and method for accessing a redundant array of independent disks.

Description of Related Art

Depending on different modes of operation, there are many types of redundant array of independent disks (RAID), such as RAID 0, RAID 1, RAID 2 to RAID 7, etc. Among them, RAID 3 to RAID 6, for example, use exclusive OR (XOR) logic to generate a parity code to achieve RAID fault tolerance. For example, RAID 5 consists of three hard disks. When there is a batch of data to be written into a redundant array of independent disks, the central processing unit will stripe the data into two different component and temporarily store them in random access memory (RAM), and then instruct the disk controller (such as the RAID controller) to write them into two different hard disks. In addition, the central processing unit also performs exclusive OR operation based on the two different component of the data to calculate the corresponding parity data and temporarily store them in the RAM, and then instruct the disk controller to write them into another hard disk.

In order to improve the performance of the system, a RAID accelerator is used to assist the central processing unit to calculate the parity data. However, after the RAID accelerator stores the calculated parity data in the RAM, the system must go through processes such as system call, file system, accessing address computation, etc., so the disk controller is idle for a long time before it starts to fetch the data from the RAM and writing the data into the hard disk.

SUMMARY

In view of the above, the disclosure provides a system and method for accessing a redundant array of independent disks, to improve the speed of data access by reducing the idle time of the disk controller.

In an embodiment of the disclosure, a system for accessing a redundant array of independent disks is coupled between a central processing unit, a main memory, and the redundant array of independent disks. The system includes an arithmetic circuit, a register, and a disk controller. The arithmetic circuit, coupled to the central processing unit and the main memory, reads data to be written from the main memory, calculates a plurality of syndromes of the data to be written, and stores the calculated syndromes of the plurality of syndromes into the main memory. The register, coupled to the arithmetic circuit, being used to store the calculation progress of calculating the plurality of syndromes by the arithmetic circuit. The disk controller, coupled to the register and the redundant array of independent disks, obtains the calculation progress from the register, and stores the calculated syndromes of the plurality of syndromes from the main memory to the redundant array of independent disks according to the obtained calculation progress.

In an embodiment of the disclosure, a method for accessing a redundant array of independent disks includes: reading data to be written in main memory; calculating a plurality of syndromes of the data to be written and storing the calculated syndromes of the plurality of syndromes into the main memory; storing the calculation progress of calculating the plurality of syndromes into a register; and reading the calculation progress stored in the register, and according to the calculation progress reading, storing the calculated syndromes of the plurality of syndromes from the main memory into the redundant array of independent disks.

Based on the above, in the system and the method for accessing redundant array of independent disks disclosed by the disclosure, a register is provided in the redundant array of independent disks accelerator to instantly store the calculation progress of calculating the plurality of syndromes. The disk controller reads the register in the redundant array of independent disks accelerator before writing the calculated syndromes of the plurality of syndromes from the main memory to the hard disk, and according to the calculation progress stored in the register, writes the calculated syndromes of the plurality of syndromes into the hard disk. Accordingly, while calculating the plurality of syndromes in the redundant array of independent disks accelerator, the disk controller write the calculated syndromes of the plurality of syndromes to the hard disk before all of the plurality of syndromes corresponding to the data to be written being calculated completely, thereby reducing the idle time of the disk controller and improving the speed of data access.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
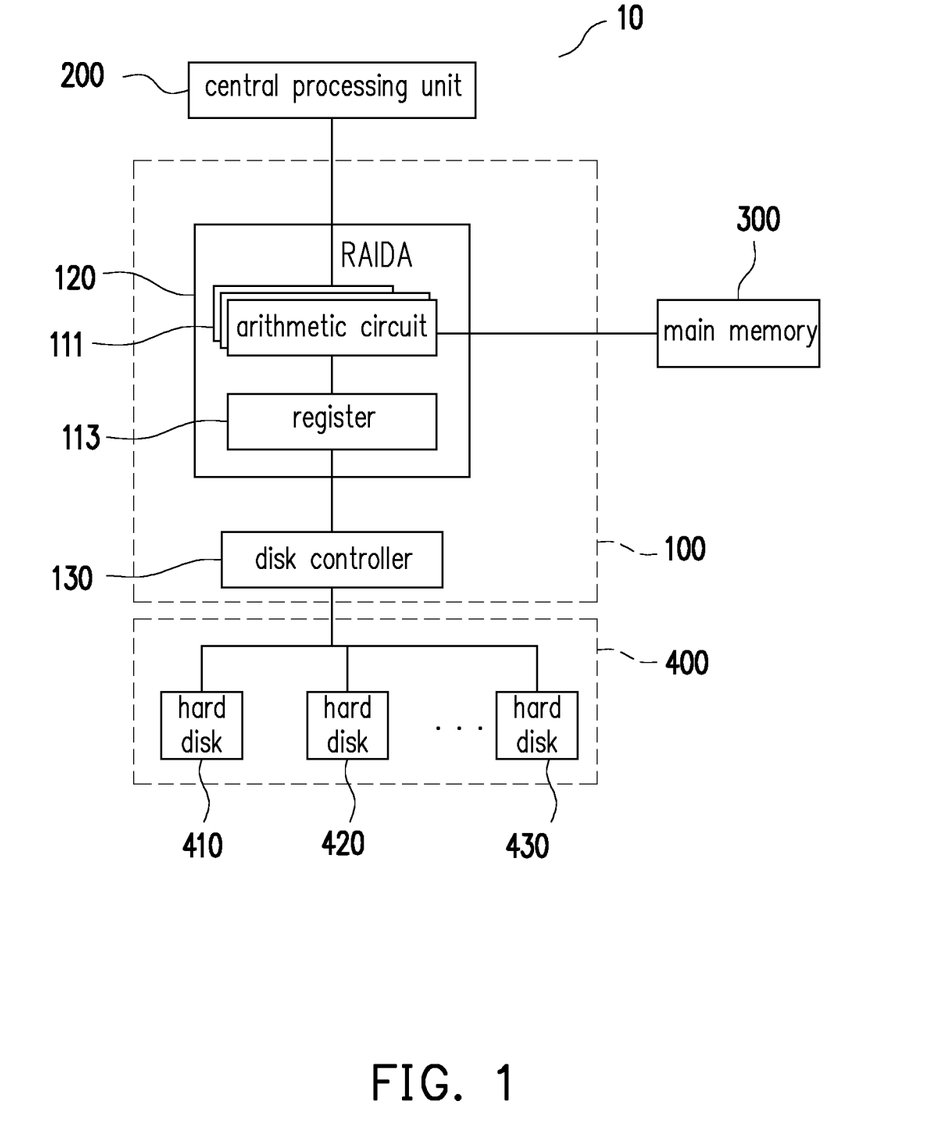
FIG. 1 is a schematic block diagram of a computer system according to an embodiment of the disclosure.

Referring to FIG. 1, a computer system 10 includes a central processing unit (CPU) 200, a main memory 300, a redundant array of independent disks (RAID) 400, and a redundant array of independent disks accessing system 100. The redundant array of independent disks accessing system 100 is coupled between the CPU 200, the main memory 300, and the redundant array of independent disks 400.

In detail, the redundant array of independent disks accessing system 100 includes an arithmetic circuit 111, a register 113, and a disk controller 130. The disk controller 130 is, for example, a hard disk array controller. The disk controller 130 is coupled to a plurality of hard disks 410, 420, 430 through a standard bus channel, such as ATA/ATAPI, SATA, SCSI, etc., to integrate these hard disks into a hard disk array. The disclosure does not limit the number of hard disks integrated into a hard disk array.

The arithmetic circuit 111 is coupled to the central processing unit 200 and the main memory 300. The arithmetic circuit 111 reads the data to be written from the main memory 300, and then calculates a plurality of syndromes of the data to be written. The arithmetic circuit 111 stores the calculated syndromes of the plurality of syndromes to the main memory 300. The register 113 is coupled to the arithmetic circuit 111. The register 113 is used to store the calculation progress of calculating the plurality of syndromes by the arithmetic circuit 111. The disk controller 130 is coupled to the register 113 and the redundant array of independent disks 400. The disk controller 130 stores the calculated syndromes of the plurality of syndromes from the main memory 300 into the redundant array of independent disks 400 according to the calculation progress stored in the register 113.

In some embodiments, the arithmetic circuit 111 and the register 113 are integrated into a redundant array of independent disks accelerator (RAIDA) 120. The arithmetic circuit 111 is used to assist the CPU 200 to do calculations required by the redundant array of independent disks 400 (for example, calculating P syndrome, Q syndrome, etc.). In particular, since the register 113 is connected to the disk controller 130 through a physical line, the disk controller 130 can quickly and directly access the calculation progress stored in the register 113.

In some embodiments, the RAIDA 120 is integrated into the north bridge chipset.

The disk controller 130 is integrated into the south bridge chipset. The CPU 200, for example, can access the main memory 300 or issue a command to the disk controller 130 through the north bridge chipset. The disk controller 130, for example, can access the main memory 300 through the north bridge chipset. In other embodiments, such as a System On Chip (SOC) embodiment, the RAIDA 120 and the disk controller 130 can be integrated into a same input/output (IO) expansion chip.

When the CPU 200 stores the data to be written into the redundant array of independent disks 400, the following embodiment details the operation flow of the redundant array of independent disks accessing system 100.

Figure 2:
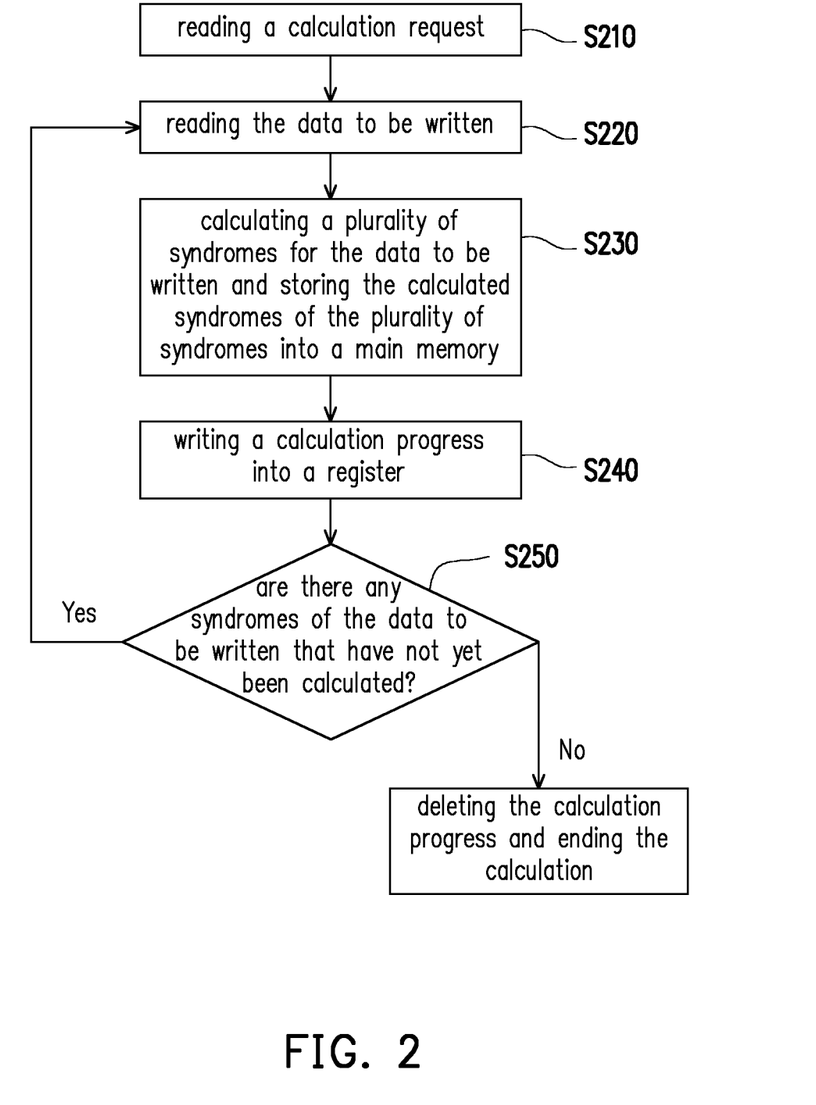
FIG. 2 is a flowchart of a method for performing data access by an arithmetic circuit according to an embodiment of the disclosure.
Figure 3:
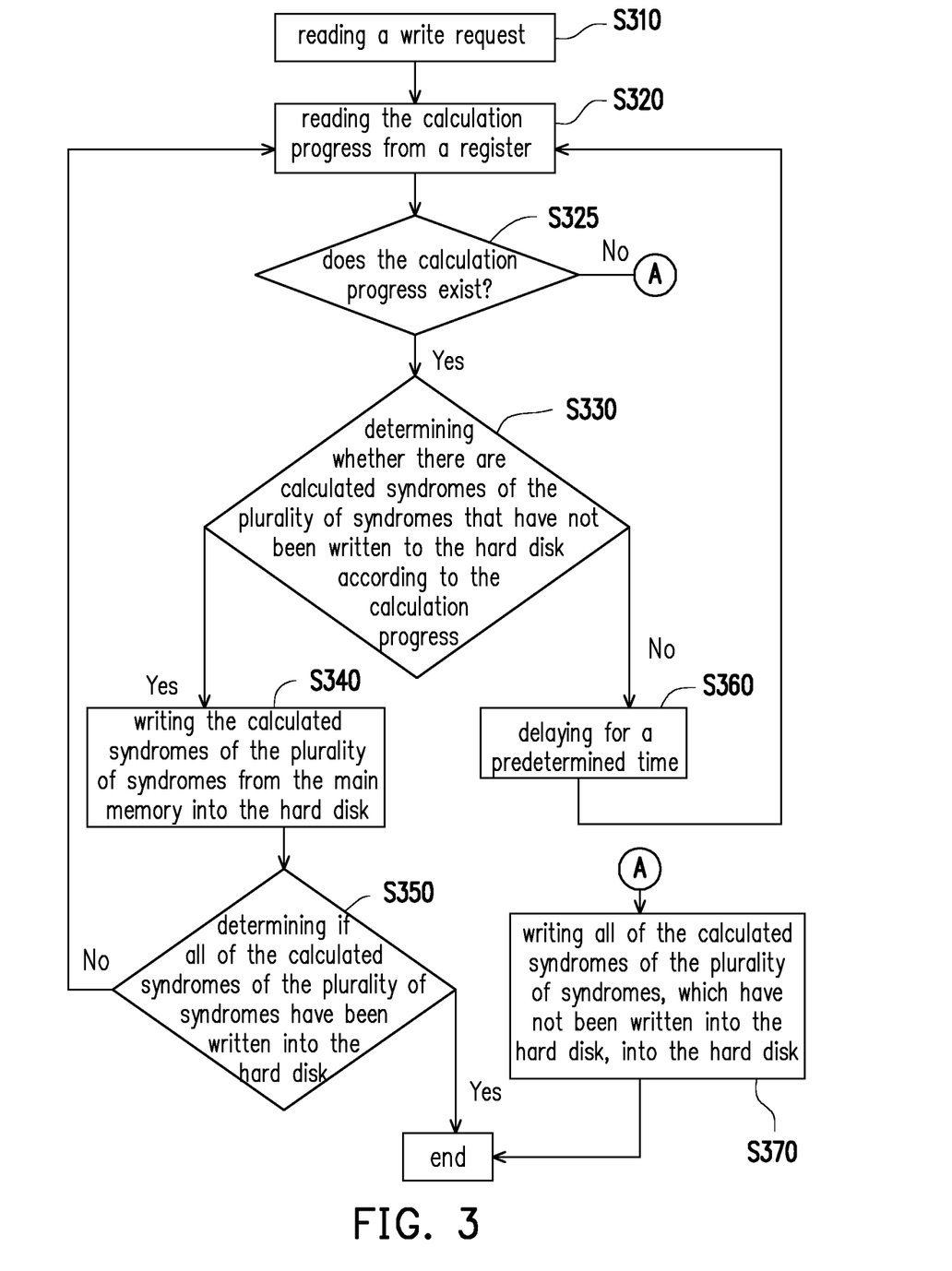
FIG. 3 is a flowchart of a method for performing data access by a disk controller according to an embodiment of the disclosure.
Figure 4:
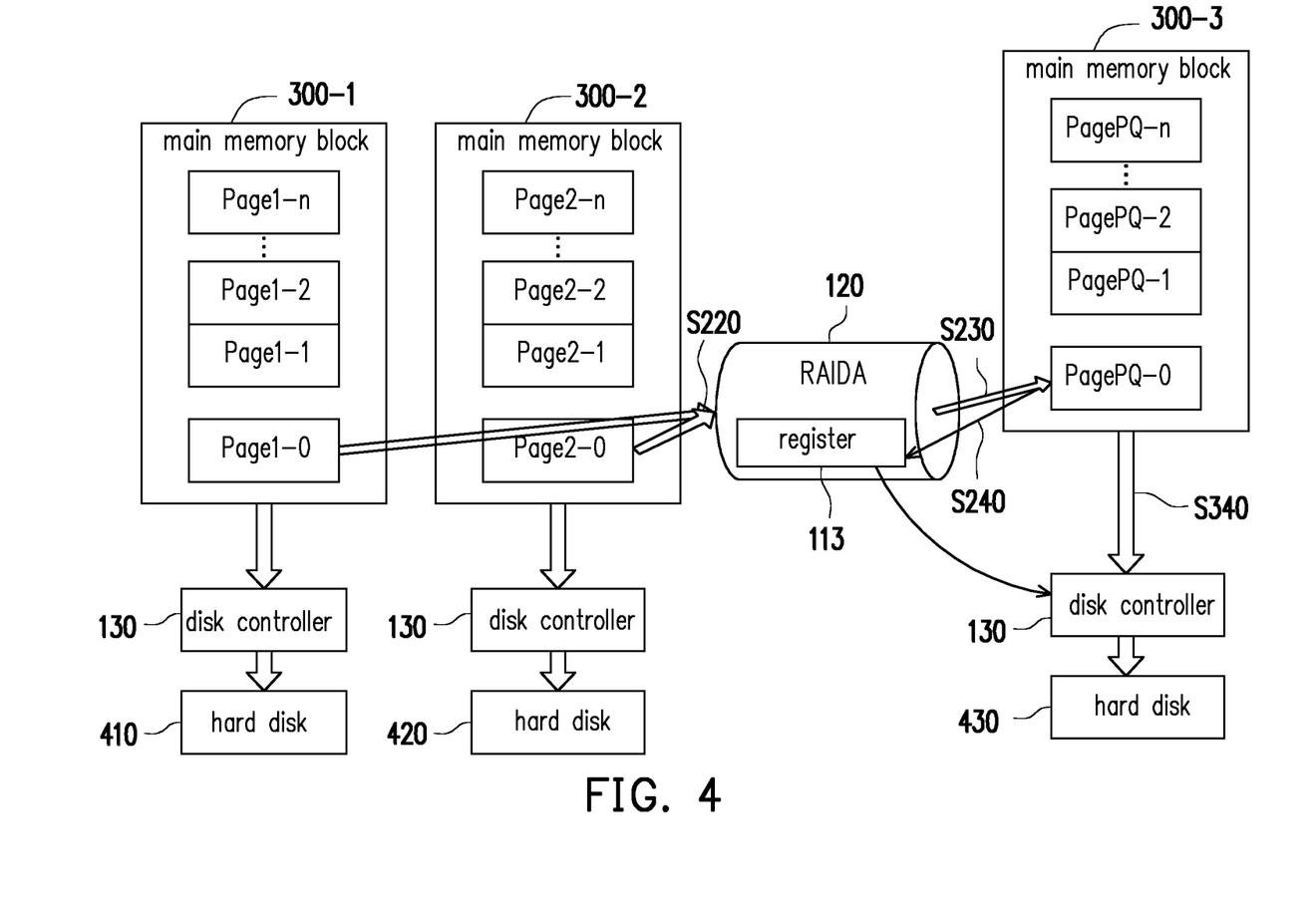
FIG. 4 is a schematic diagram of a data access method according to an embodiment of the disclosure.

FIG. 2 is a flowchart of a method for performing data access by an arithmetic circuit according to an embodiment of the disclosure. FIG. 3 is a flowchart of a method for performing data access by a disk controller according to an embodiment of the disclosure. FIG. 4 is a schematic diagram of a data accessing method according to an embodiment of the disclosure.

Referring to FIG. 4 first, in some embodiments, the CPU 200, for example, divides the data to be written into a first component and a second component, and then respectively stores them into two different blocks 300-1 and 300-2 of the main memory 300. The first component includes, for example, n+1 pages of data Page1-0 to Page1-n. The second component includes, for example, n+1 pages of data Page2-0 to Page2-n. The calculated syndromes of the plurality of syndromes corresponding to the data to be written will be stored in block 300-3 of the main memory 300.

Similarly, the plurality of syndromes includes, for example, n+1 pages of data PagePQ-0 to PagePQ-n. The plurality of syndromes of each page corresponds to a page of the first component and a page of the second component of the data to be written. For example, the Page1-0 of the first component and the Page2-0 of the second component correspond to the pagePQ-0 of the plurality of syndromes. The size of each page may be, for example, 4 kilobytes (KB). The disk controller 130 writes the first component of the data to be written from the main memory 300 into the hard disk 410, and writes the second component of the data to be written from the main memory 300 into the hard disk 420. In the disclosure, while the RAIDA 120 calculates the plurality of the syndromes, the disk controller 130 writes the calculated syndromes of the plurality of syndromes from the main memory 300 into the hard disk 430 to achieve RAID fault tolerance.

However, the disclosure does not limit the specific way in which the data to be written is divided. For example, the data to be written can also be divided into three or more components, and can be stored into three or more blocks of the main memory 300.

In some embodiments, the CPU 200, for example, may generate a calculation request for the RAIDA 120 corresponding to the data to be written, for which the syndromes need to be calculated. The CPU 200 then instruct the RAIDA 120 to calculate the plurality of syndromes of the data to be written according to the calculation request. For example, the CPU 200 may configure a calculation request table (not shown) in the main memory 300. The calculation request table is configured to record a plurality of calculation requests on a first-in first-out basis. Through the calculation request, the CPU 200 inform the RAIDA 120 of a plurality of data to be written, for which the plurality of syndromes need to be calculated. The CPU 200 selects a portion of pages from the first component and the second component of the data to be written stored in the blocks 300-1 and 300-2 in the main memory 300 (for example, selecting 16 pages from the first component and the second component), and obtains addresses and lengths of the pages of the selected first component and of the selected second component in the main memory 300. Then, according to the address and length of one of the pages of the selected first component and of the selected second component in the main memory 300, a corresponding syndrome storage space is allocated in the block 300-3 of the main memory 300. The address and length of the storage space for the plurality of syndromes are obtained. Then, a corresponding calculation progress is generated in the register 113, and the address of the calculation progress in the register 113 is obtained. According to the address and length of the pages of the first component and of the second component of the selected data to be written, the address and length of the storage space for the plurality of syndromes of the pages of the first component and of the second component of the selected data to be written in the main memory 300, and the address of the calculation progress in the register 113, the CPU 200 generates a corresponding calculation request. The calculation request is stored in the main memory 300 (e.g., the calculation request table stored in the main memory 300). Then the RAIDA 120 is notified to read the calculation request from the main memory 300, and the RAIDA 120 calculates the plurality of syndromes according to the calculation request. While the RAIDA 120 calculates the plurality of syndromes, the CPU 200 instructs the disk controller 130 to save the calculated syndromes of the plurality of syndromes (described in more detail below). In an embodiment, the CPU 200 generates a write request based on a portion of the calculation request, and instructs the disk controller 130 to save the calculated syndromes of the plurality of syndromes.

In an embodiment, if there are any remaining pages of the data to be written, for which the calculation request has not been generated, the CPU 200 repeats the above process to generate a next calculation request until all of the calculation requests for all pages of the data to be written are generated and stored into the main memory 300 (for example, the calculation request table in the main memory 300). Accordingly, the RAIDA 120 sequentially obtains a calculation request from the main memory 300, calculates the plurality of syndromes corresponding to the data to be written, writes the calculated syndromes of the plurality of syndromes into the corresponding storage space in the block 300-3 of the main memory 300, and immediately updates the calculation progress corresponding to the calculation request in the register 113. After receiving the notification from the CPU 200, the disk controller 130 reads the calculation progress corresponding to the calculation request from the register 113, and writes the calculated syndromes of the plurality of syndromes into the hard disk 430 according to the calculation progress (details will be given below). In an embodiment, after receiving the notification from the CPU 200, the disk controller 130 reads the write request corresponding to the calculation request in the main memory 300 and processes it. According to the write request, the disk controller 130 reads the corresponding calculation progress in the register 113.

After the calculation of all of the plurality of syndromes corresponding to the calculation request is completed, the RAIDA 120 deletes the corresponding calculation progress in the register 113, and sequentially obtains the next calculation request from the main memory 300 (for example, the calculation request table in the main memory 300). Then, the RAIDA 120 calculates the plurality of syndromes for the data to be written corresponding to the next calculation request until all calculation requests have been processed (for example, the calculation request table is empty). However, the disclosure does not limit the specific notification implementation from the CPU 200 to the RAIDA 120.

In an embodiment, the CPU 200 configures a write request table (not shown) in the main memory 300 for storing a plurality of write requests on a first-in first-out basis to inform the disk controller 130 of the calculated syndromes of the plurality of syndromes that need to be written into the hard disk 430. After generating the calculation request and notifying the RAIDA 120, the CPU 200 generates a corresponding write request based on a portion of the calculation request and stores it in the write request table, and then notifies the disk controller 130 to read and process the write request. The disk controller 130 reads the write request from the write request table and generates a write progress in its register (not shown). According to the write request, the disk controller 130 obtains a calculation progress of the plurality of syndromes, and obtains the address, length of the plurality of syndromes in the main memory 300. If the calculation progress is greater than the write progress, the disk controller 130 reads the calculated syndromes of the plurality of syndromes. And then the disk controller 130 write the calculated syndromes of the plurality of syndromes into the hard disk 430, while the write progress is updated. If the calculation progress is equal to the write progress, the disk controller 130 reads the calculation progress from the register 113 after a predetermined time (for example, 10 milliseconds). If the calculation progress of calculating the plurality of syndromes does not exist in the register 113, it means that the plurality of syndromes corresponding to the write request have been calculated completely, and all of the plurality of syndromes corresponding to the write request may be directly written into the hard disk 430 from the main memory 300. The above process is repeated until all the calculated syndromes of the plurality of syndromes corresponding to the write request are written into the hard disk 430 and the corresponding write progress is deleted.

After a write request is processed completely, the disk controller 130 reads the next write request from the write request table and process it until the write request table is empty.

In particular, when the RAIDA 120 is calculating the plurality of syndromes corresponding to a calculation request, the disk controller 130 reads the calculation progress according to the obtained write request corresponding to the calculation request. And the disk controller 130 writes the calculated syndromes of the plurality of syndromes corresponding to the calculation request from the main memory 300 into the hard disk 430. Thus, while the RAIDA 120 is calculating the plurality of syndromes (i.e., before all of the plurality of syndromes are calculated completely), the disk controller 130 can write the calculated syndromes of the plurality of syndromes from the main memory 300 into the hard disk 430, without waiting for all of the plurality of syndromes corresponding to the data to be written are calculated completely. Thereby the idle time of the disk controller 130 is reduced greatly.

In an embodiment, the CPU 200 generates a calculation request and a write request through executing the code in the main memory 300. In another embodiment, the CPU 200 executes the code to store the calculation request and the write request into the calculation request table and the write request table respectively.

In another embodiment, the RAIDA 120 includes a plurality of arithmetic cores. Each of the arithmetic cores can calculate syndromes for different portions of the data to be written at the same time, thereby improving the computing power of the RAIDA 120.

Referring to FIG. 2, FIG. 1 and FIG. 4. In step S210, the RAIDA 120 reads the calculation request from the main memory 300 (for example, the calculation request table in the main memory 300). In step S220, the RAIDA 120 reads the data to be written corresponding to the calculation request according to the calculation request (for example, the address and length of the data to be written in the calculation request). The RAIDA 120 can read out the components of the data to be written corresponding to the calculation request from the main memory 300. For example, the RAIDA 120 reads the first component and the second component of the data to be written from the blocks 300-1 and 300-2 of the main memory 300 respectively. For another example, the components of the data to be written can also be stored in the cache memory of the CPU 200. Therefore, the arithmetic circuit 111 can also directly read the components of the data to be written from the cache memory of the CPU 200. The disclosure is not limited to storing the data to be written to a specific location.

In some embodiments, the arithmetic circuit 111 of the RAIDA 120, for example, reads a first page of the first component Page1-0 and a first page of the second component Page2-0 in step S220.

In step S230, the arithmetic circuit 111 calculates the syndromes for the data to be written and stores the calculated syndromes of the plurality of syndromes in the main memory 300. Specifically speaking, the arithmetic circuit 111 calculates the plurality of syndromes corresponding to the data to be written, and writes the calculated syndromes of the plurality of syndromes into the block 300-3 of the main memory 300 according to the address in the calculation request. For example, the arithmetic circuit 111 performs an exclusive OR (XOR) operation on a first page of the first component Page1-0 and a first page of the second component Page2-0 to obtain the plurality of syndromes, and writes the calculated syndromes of the plurality of syndromes into the first page PagePQ-0 of the block 300-3 of main memory 300.

However, the disclosure is not limited to a specific method of calculating the plurality of syndromes, those skilled in the art will be able to implement the specifications according to their needs and the specification of the RAID.

In step S240, the RAIDA 120 writes the calculation progress of the arithmetic circuit 111 into the register 113. In detail, the RAIDA 120 stores the current progress of calculating the plurality of syndromes for the data to be written into the register 113 according to the address of the calculation progress in the calculation request, and updates it in real time. For example, the RAIDA 120 updates the calculation progress stored in the register 113 after the arithmetic circuit 111 has calculated the plurality of syndromes for each page.

For example, the RAIDA 120 will instantly store the calculation progress (for example, the percentage of pages that has been calculated, or the start address of the calculated syndromes of the plurality of syndromes that is recently stored in the main memory 300) into the register 113 after the calculation of the plurality of syndromes of the first page PagePQ-0 is finished. However, as long as it can represent the calculation progress of calculating the plurality of syndromes, the disclosure does not limit the specific form of the calculation progress.

In some embodiments, the RAIDA 120 further stores the storage address and length of the calculated syndromes of the plurality of syndromes (for example, the physical address of the block 300-3 and the total length of n+1 pages is 4n+4 KB) into a corresponding calculation progress in the register 113.

In step S250, the RAIDA 120 determines if there are any syndromes of the data to be written that have not yet been calculated. If no, the calculation progress is deleted and the calculation is ended. Otherwise, the RAIDA 120 returns to step S220 to continue to read the data to be written, and repeats steps S230 to S250 until all of the plurality of syndromes of the data to be written are calculated completely.

For example, after the plurality of syndromes of the first page PagePQ-0 are calculated completely, the RAIDA 120 returns to step S220 to read Page1-1 (the second page of the first component) and Page2-1 (the second page of the second component) of the data to be written, and repeats steps S230 to S250 to calculate the plurality of syndromes of the second page PagePQ-1. After the plurality of syndromes of the first page PagePQ-0 are calculated completely, the RAIDA 120 returns to step S220 to read Page1-2 (the third page of the first component) and Page2-2 (the third page of the second component) of the data to be written, and repeats steps S230 to S250 to calculate the plurality of syndromes of the third page PagePQ-1, and so on, until the plurality of syndromes of n+1th page PagePQ-n are completely calculated and written into the block 300-3 of the main memory 300.

Especially, since the CPU 200 notifies the disk controller 130 to read the calculation progress when the RAIDA 120 has not calculated all of the plurality of syndromes for the data to be written, the disk controller 130 can synchronously write the calculated syndromes of the plurality of syndromes from the block 300-3 of the main memory 300 into the hard disk 430.

Please refer to FIG. 3, FIG. 1 and FIG. 4. In step S310, the disk controller 130 receives a notification from the CPU 200, and then read a write request from the main memory 300 (for example, from a write request table in the main memory 300). For example, the CPU 200 may generate a calculation request and then instruct the RAIDA 120 to calculate the plurality of syndromes of the data to be written according to the generated calculation request. And then the CPU 200 generates a corresponding write request according to a portion of the calculation request and notify the disk controller 130 to read the generated write request. In step S320, the disk controller 130 reads the calculation progress from the register 113 according to the write request, and then writes the calculated syndromes of the plurality of syndromes from the main memory 300 to the hard disk 340 (described in more detail below). Therefore, the disk controller 130 can write the calculated syndromes of the plurality of syndromes from the main memory 300 to the hard disk 340 before the arithmetic circuit 111 finishes the calculation of the plurality of syndromes for the data to be written. In other embodiments, the write request may not be generated. In step S310, the disk controller 130 directly reads the calculation request from the main memory 300 (for example, the calculation request table in the main memory 300) after received the notification from the CPU 200. In step S320, the disk controller 130 reads the corresponding calculation progress from the register 113 according to the calculation request.

In summary, in step S320, the disk controller 130 reads the calculation progress from the register 113 of the RAIDA 120.

In step S325, the disk controller 130 determines whether the calculation progress exists according to the reading result in step S320. If the calculation progress exists, in step S330, the disk controller 130 determines whether there are calculated syndromes of the plurality of syndromes that has not been written to the hard disk 430 according to the calculation progress. If the calculation progress does not exist, the disk controller 130 proceeds to step S370 (described in detail below).

In step S330, according to the calculation progress, the disk controller 130 determines whether there are calculated syndromes of the plurality of syndromes that have not been written into the hard disk 430. If there are calculated syndromes of the plurality of syndromes that have not been written to the hard disk 430, the disk controller 130 proceeds to step S340. In step S340, the disk controller 130 writes the calculated syndromes of the plurality of syndromes of the data to be written from the main memory 300 into the hard disk 430 according to the calculation progress stored in the register 113.

For example, suppose the disk controller 130 has not yet written any syndromes into the hard disk 430, the calculation progress in the register 113 indicates that the RAIDA 120 has finished the calculation of the plurality of syndromes of the first page PagePQ-0 but has not finished the calculation of the plurality of syndromes of the second page PagePQ-1. Accordingly, the disk controller 130 determines that the block 300-3 of the main memory 300 stores the plurality of syndromes of the first page PagePQ-0 have not been written to the hard disk 430, and then writes the plurality of syndromes of the first page PagePQ-0 into the hard disk 430. For another example, assuming the plurality of syndromes of the first page PagePQ-0 have been written to the hard disk 430 by the disk controller 130, the calculation progress stored in the register 113 indicates that the RAIDA 120 has finished the calculation of the plurality of syndromes of the third page PagePQ-2 but has not finished the calculation of the plurality of syndromes of the fourth page PagePQ-3. Accordingly, the disk controller 130 determines the block 300-3 of the main memory stores the plurality of syndromes of the first page PagePQ-1 and of the second page PagePQ-2, which have not been written to the hard disk 430, and then writes the plurality of syndromes of the first page PagePQ-1 and of the second page PagePQ-2 into the hard disk 430, and so on.

In some embodiments, the disk controller 130 further reads storage address and data length of the plurality of syndromes from the calculation request or the write request. And at the same time, the disk controller 130 writes the calculated syndromes of the plurality of the syndromes from the main memory 300 into the hard disk 430 according to the calculation progress in the register 113 and the storage address and data length of the plurality of syndromes in the main memory 300.

Subsequently, in step S350, the disk controller 130 determines if all of the calculated syndromes of the plurality of the syndromes have been written into the hard disk 430. If so, the writing process ends. Otherwise, the disk controller 130 returns to step S320 to continue to read the calculation progress from the register 113.

In step S330, if the disk controller 130 determines that all of the calculated syndromes of the plurality of syndromes have been written into the hard disk 430, the disk controller 130 proceeds to step S360 to delay for the predetermined time and then returns to step S320. In detail, if the disk controller 130 determines that all of the calculated syndromes of the plurality of syndromes have been written into the hard disk 430, the progress of writing the calculated syndromes of the plurality of syndromes from the main memory 300 into the hard disk 430 has reached the calculation progress of the arithmetic circuit 111. Therefore, the disk controller 130 may delay for a predetermined time and then return to step S320 to read the calculation progress, and repeats the steps S325 to S350 until the plurality of syndromes of the data to be written are completely calculated and written to the hard disk 430.

In step S325, if the calculation progress does not exist, it means all of the plurality of syndromes corresponding to the calculation request have been calculated completely, so there is no need to control the write speed according to the calculation progress. Therefore, the disk controller 130 proceeds to step S370. In step S370, the disk controller 130 directly write all of the calculated syndromes of the plurality of syndromes, which have not been written to the hard disk 430, into the hard disk 430, and then ends.

In addition, it is worth mentioning that the arithmetic circuit 111 of the RAIDA 120 calculates the plurality of syndromes through accessing the cache memory of the CPU 200 or the main memory 300, and stores the calculated syndromes of the plurality of syndromes into the main memory 300. The disk controller 130 writes the calculated syndromes of the plurality of syndromes from the main memory 300 into the hard disk 430. The speed of accessing the cache memory and main memory is much faster than the speed of accessing the hard disk, so even if the progress of writing the calculated syndromes of the plurality of syndromes into the hard disk 430 has reached the calculation progress of calculating the plurality of syndromes (i.e., step S330: No), the disk controller 130 only needs to delay for a very short time (for example, a delay of milliseconds, microseconds or an even shorter time) in step S360 before returning to step S320 to read the calculation progress again.

In summary, the system and method for accessing redundant array of independent disks proposed by embodiments of the disclosure provide a register in the redundant array of independent disks accelerator to instantly store the progress of calculating the plurality of syndromes of the redundant array of independent disks accelerator. Before the disk controller writes the calculated syndromes of the plurality of syndromes from the main memory into the hard disk, it reads the calculation progress from the registers in the redundant array of independent disks accelerator, and then according to the calculation progress, writes the calculated syndromes of the plurality of syndromes from the main memory into the hard disk. Hereby, during the redundant array of independent disks accelerator is calculating the plurality of syndromes, the disk controller can write the calculated syndromes of the plurality of syndromes into the hard disk without waiting for all of the plurality of syndromes corresponding to the data to be written to be completely calculated and stored into the main memory, thereby reducing the idle time of the disk controller and improve the speed of data access.

Although the disclosure has been disclosed in the above embodiments, it is not intended to limit the disclosure. Anyone having ordinary knowledge in the art can make some changes and refinements without departing from the spirit and scope of the disclosure. Therefore, the scope of protection of the disclosure is subject to the scope of the claims of the patent application.

What is claimed is:

1. A system for accessing a redundant array of independent disks, wherein the system is coupled between a central processing unit, a main memory, and the redundant array of independent disks, the system comprising:
   an arithmetic circuit, coupled to the central processing unit and the main memory, reads data to be written from the main memory, calculates a plurality of syndromes for the data to be written, and stores the calculated syndromes of the plurality of syndromes into the main memory;
   a register, coupled to the arithmetic circuit, stores a calculation progress of calculating the plurality of syndromes of the data to be written by the arithmetic circuit; and
   a disk controller, coupled to the register and the redundant array of independent disks, reads the calculation progress of calculating the plurality of syndromes of the data to be written from the register and stores the calculated syndromes of the plurality of syndromes from the main memory into the redundant array of the independent disks according to the calculation progress;
   wherein while the arithmetic circuit calculates the plurality of syndromes of the data to be written, the central processing unit instructs the disk controller to store the calculated syndromes of the plurality of syndromes into the redundant array of the independent disks.

2. The system of claim 1, wherein the central processing unit generates a calculation request for the data to be written for which the plurality of syndromes need to be calculated, and writes the calculation request to the main memory.

3. The system of claim 2, wherein the central processing unit further informs the arithmetic circuit to read the calculation request from the main memory, and according to the calculation request, to read the data to be written to calculate the plurality of syndromes.

4. The system of claim 2, wherein the central processing unit further calculates and allocates a storage space required by the plurality of syndromes according to address and length of the data to be written in the main memory, obtains address and length of the plurality of syndromes in the main memory according to the allocated storage space; the central processing unit further generates the calculation progress in the register, and obtains address of the calculation progress in the register; the central processing unit further generates the calculation request based on the address and length of the data to be written in the main memory, the address and length of the plurality of syndromes in the main memory, and the address of the calculation progress in the register.

5. The system of claim 2, wherein the central processing unit further generates a write request according to a portion of the calculation request, wherein the disk controller reads the calculation progress according to the write request and stores the calculated syndromes of the plurality of syndromes from the main memory into the redundant array of independent disks according to the calculation progress.

6. The system of claim 2, wherein the disk controller reads the calculation progress corresponding to the calculation request, and if the calculation progress does not exist, the disk controller stores the calculated syndromes of the plurality of syndromes corresponding to the calculation request from the main memory into the redundant array of independent disks.

7. The system of claim 2, wherein the arithmetic circuit deletes the calculation progress corresponding to the calculation request after all of the plurality of syndromes corresponding to the calculation request are calculated completely.

8. The system of claim 1, wherein the arithmetic circuit further comprises a plurality of arithmetic cores configured to calculate the plurality of syndromes of the data to be written at the same time.

9. The system of claim 1, wherein the disk controller starts to obtain the calculation progress from the register before all of the syndromes are calculated completely, and stores the calculated syndromes of the plurality of syndromes from the main memory into the redundant array of independent disks according to the calculation progress.

10. The system of claim 1, wherein the disk controller reads the calculation progress from the register, and if all of the calculated syndromes of the plurality of syndromes have been stored from the main memory into the redundant array of independent disks, the disk controller delays for a predetermined time and then reads the calculation progress from the register.

11. The system of claim 1, wherein the arithmetic circuit updates the calculation progress in the register while calculating the plurality of syndromes.

12. A data access method for a redundant array of independent disks, comprising:
reading data to be written in a main memory;
calculating a plurality of syndromes for the data to be written and storing the calculated syndromes of the plurality of syndromes into the main memory;
storing a calculation progress of calculating the plurality of syndromes of the data to be written into a register; and
reading the calculation progress of calculating the plurality of syndromes of the data to be written from the register and storing the calculated syndromes of the plurality of syndromes from the main memory into the redundant array of independent disks according to the calculation progress;
wherein while calculating the plurality of syndromes of the data to be written, instructing to store the calculated syndromes of the plurality of syndromes into the redundant array of independent disks.

13. The method of claim 12, further comprising generating, by a central processing unit, a calculation request for the data to be written for which the plurality of syndromes need to be calculated, and writing the calculation request to the main memory.

14. The method of claim 13, further comprising reading the calculation request from the main memory, and according to the calculation request, reading the data to be written to calculate the plurality of syndromes.

15. The method of claim 13, wherein the process of generating the calculation request by the central processing unit is:
obtaining address and length of the data to be written in the main memory;
calculating and allocating the storage space required by the plurality of syndromes in the main memory, and obtaining address and length of the plurality of syndromes in the main memory according to the allocated storage space;
generating the calculation progress in the register, and obtaining address of the calculation progress in the register;
generating the calculation request according to the address and length of the data to be written in the main memory, the address and length of the plurality of syndromes in the main memory, and the address of the calculation progress in the register.

16. The method of claim 13, further comprising generating, by the central processing unit, a write request according to a portion of the calculation request, and reading the calculation progress according to the write request and storing the calculated syndromes of the plurality of syndromes from the main memory into the redundant array of independent disks according the calculation progress.

17. The method of claim 13, further comprising reading the calculation progress corresponding to the calculation request, if the calculation progress does not exist, the calculated syndromes of the plurality of syndromes corresponding to the calculation request are directly stored from the main memory into the redundant array of independent disks.

18. The method of claim 13, further comprising deleting the calculation progress after all of the plurality of syndromes corresponding to the calculation request are calculated completely.

19. The method of claim 12, further comprising obtaining the calculation progress from the register before all of the plurality of syndromes are calculated completely, and storing the calculated syndromes of the plurality of syndromes from the main memory into the redundant array of independent disks according to the calculation progress.

20. The method of claim 12, further comprising, after reading the calculation progress from the register, if all of the calculated syndromes of the plurality of syndromes have been stored from the main memory into the redundant array of independent disks, the calculation progress is read from the register after delaying for a predetermined time.

21. The method of claim 12, wherein the calculation progress in the register is updated while calculating the plurality of syndromes.

* * * * *